United States Patent
Willis

[19]

[11] Patent Number: 6,089,339
[45] Date of Patent: Jul. 18, 2000

[54] DRIVE RECONFIGURATION MECHANISM FOR TRACKED ROBOTIC VEHICLE

[75] Inventor: W. David Willis, Idaho Falls, Id.

[73] Assignee: Bechtel BWXT Idaho, LLC, Idaho Falls, Id.

[21] Appl. No.: 09/025,822

[22] Filed: Feb. 18, 1998

[51] Int. Cl.[7] ............................................. B62D 55/00
[52] U.S. Cl. .................... 180/9.46; 180/9.1; 180/9.5; 180/9.52; 180/209
[58] Field of Search ................................ 180/9.1, 9.46, 180/48, 9.62, 901, 9.52, 164, 24.02, 209

[56] References Cited

U.S. PATENT DOCUMENTS

| | | | |
|---|---|---|---|
| 2,641,480 | 6/1953 | Bancroft | 280/87 |
| 2,954,833 | 10/1960 | Davidson | 180/9.2 |
| 2,961,057 | 11/1960 | Johnson | 180/6.2 |
| 3,001,601 | 9/1961 | Aghnides | 180/75 |
| 3,592,283 | 7/1971 | Fischbach | 180/9.44 |
| 3,776,325 | 12/1973 | Jespersen | 180/6.48 |
| 3,869,010 | 3/1975 | Stedman | 180/6.7 |
| 3,926,273 | 12/1975 | Blomstrom et al. | 180/9.48 |
| 3,972,379 | 8/1976 | Norris | 180/234 |
| 4,515,337 | 5/1985 | Torras | 248/371 |
| 4,630,701 | 12/1986 | Venetjoki | 180/209 |
| 4,998,596 | 3/1991 | Miksitz | 180/213 |
| 5,074,370 | 12/1991 | Lindstrot et al. | 180/9.52 |
| 5,395,129 | 3/1995 | Kao | 280/5.22 |

Primary Examiner—Brian L. Johnson
Assistant Examiner—Dianna Draper
Attorney, Agent, or Firm—Klaas Law O'Meara & Malkin

[57] ABSTRACT

Drive reconfiguration apparatus for changing the configuration of a drive unit with respect to a vehicle body may comprise a guide system associated with the vehicle body and the drive unit which allows the drive unit to rotate about a center of rotation that is located at about a point where the drive unit contacts the surface being traversed. An actuator mounted to the vehicle body and connected to the drive unit rotates the drive unit about the center of rotation between a first position and a second position.

21 Claims, 5 Drawing Sheets

DRIVE RECONFIGURATION MECHANISM FOR TRACKED ROBOTIC VEHICLE

CONTRACTUAL ORIGIN OF THE INVENTION

The United States has rights in this invention pursuant to Contract No. DE-AC07-94ID13223 between the U.S. Department of Energy and Lockheed Martin Idaho Technologies Company.

FIELD OF INVENTION

This invention relates to robotic apparatus in general and more specifically to robotic vehicles for traversing duct systems and other channel-like conduit members.

BACKGROUND OF THE INVENTION

Numerous kinds of robotic vehicles have been developed and are being used to traverse duct systems for the purpose of performing any of a wide variety of tasks. For example, a robotic vehicle may be equipped with cleaning apparatus suitable for cleaning the inside surfaces of the duct. Alternatively, the vehicle may be fitted with a small camera to allow for the visual inspection of the duct system from a remote location. In still other applications, the vehicle may be equipped with ultrasonic or other sensors to ascertain the structural integrity of the duct system.

Regardless of the particular task that is to be performed, most robotic vehicles utilize wheels or track drive assemblies to move the vehicles through the duct systems. Unfortunately, however, while such wheeled or tracked vehicles tend to work well, they are often limited to use in duct systems having specific geometries and sizes. For example, a robotic vehicle designed to traverse duct systems having flat floor sections (e.g., duct systems having square or rectangular cross-sections) usually cannot be used in duct systems having curved floor sections (i.e., duct systems having circular or elliptical cross-sections), and vice-versa. Moreover, a vehicle designed to traverse duct systems having curved floor sections is usually limited to duct systems falling within certain size ranges (e.g., circular duct systems having diameters in the range of 8–10 inches or having diameters in the range of 14–18 inches). Consequently, it is usually necessary to use a separate robotic vehicle for each different type of duct geometry and/or size range.

Partly in an effort to avoid the need to utilize a separate, specially designed vehicle for each different duct geometry and size range, vehicle reconfiguration systems have been developed which allow a single robotic vehicle to be specially configured to operate in duct systems having different sizes and geometries. A common type of reconfiguration system utilizes a plurality of special adapters or attachments that may be used to change the configuration of the robotic vehicle: A first set of adapters or attachments may allow the vehicle to traverse ducts having rectangular cross-sections, while another set of adapters or attachments may allow the vehicle to traverse ducts having circular cross-sections.

While such vehicle reconfiguration systems are useful in that they allow a single vehicle to be used in duct systems having different sizes and geometries, they are still not without their problems. For example, the adapters or attachments generally limit the vehicle to operation to one type of duct geometry (e.g., rectangular or circular) at a time, thus requiring the vehicle to be manually reconfigured with a different set of adapters or attachments before it can be used in another type of duct geometry. Moreover, the adapters or attachments that allow the vehicle to traverse duct systems having circular cross-sections usually allow the vehicle to effectively traverse only those duct systems that fall within a relatively small size range. That is, an adapter system may limit the vehicle to use in circular duct systems having diameters in the range of 8–10 inches or having diameters in the range of 14–18 inches. Consequently, vehicles utilizing such reconfiguration systems are still limited in that they cannot readily accommodate variations in duct size and geometry.

Therefore, a need exists for a robotic vehicle for traversing duct systems that can readily accommodate variations in duct size and/or geometry. Ideally, such a system should be capable of reconfiguring the vehicle "on the fly" so that the vehicle can adapt to changes in duct size and geometry that may occur in a single duct system. Additional advantages could be realized if such a reconfiguration system were relatively compact, allowing the vehicle to be made as small as possible, thus allowing it to be used in systems having relatively small duct sizes.

SUMMARY OF THE INVENTION

Drive reconfiguration apparatus for changing the configuration of a drive unit with respect to a vehicle body may comprise a guide system associated with the vehicle body and the drive unit which allows the drive unit to rotate about a center of rotation that is located at about a point where the drive unit contacts the surface being traversed. An actuator system mounted to the vehicle body and connected to the drive unit rotates the drive unit about the center of rotation between a first position and a second position.

Also disclosed is a vehicle for traversing flat and curved surfaces that comprises a vehicle body having a first side and a second side. A first drive unit assembly is mounted on the first side of the vehicle body so that the first drive unit assembly may be rotated about a first center of rotation that is located at about a point where the first drive unit assembly contacts the surface being traversed. A second drive unit assembly is mounted on the second side of the vehicle body so that the second drive unit assembly may be rotated about a second center of rotation located at about a point where the second drive unit assembly contacts the surface being traversed. An actuator system mounted to the vehicle body and operatively associated with the first and second drive assemblies simultaneously rotates the first and second drive assemblies about the first and second centers of rotation, respectively.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
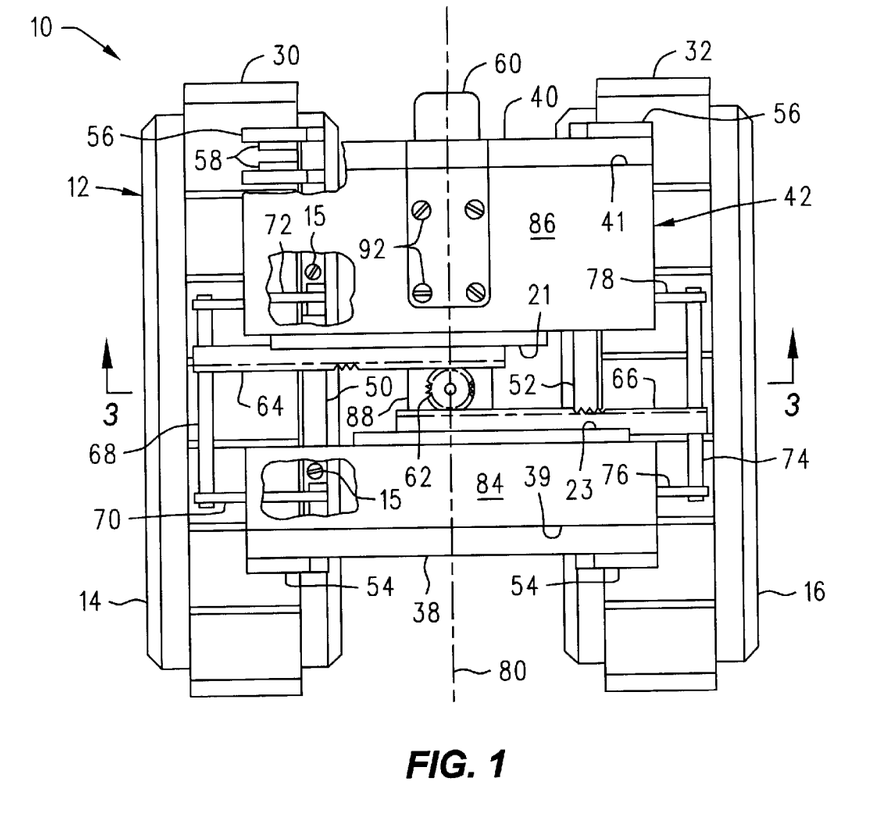
FIG. 1 is a plan view of a robotic vehicle and drive reconfiguration system according to the present invention with the top cover of the vehicle removed and portions of the vehicle body broken away to more clearly show the right side drive unit bracket and link assembly.
Figure 2:
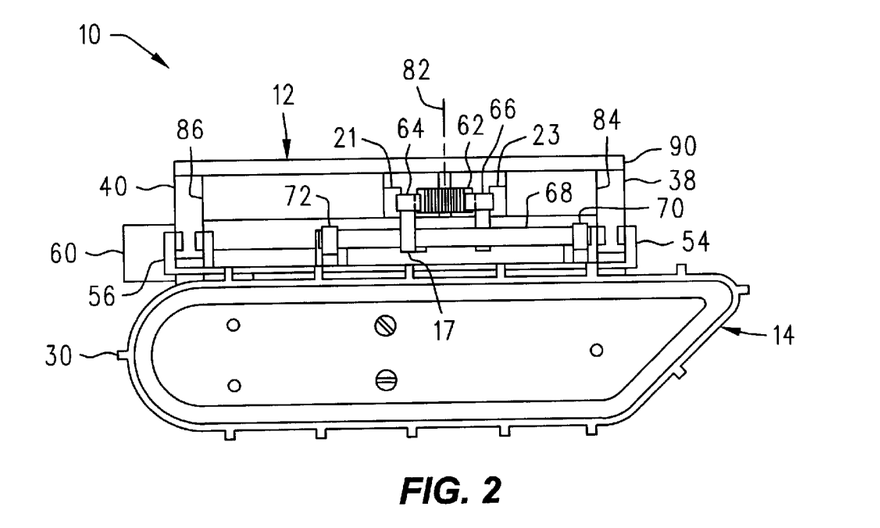
FIG. 2 is a right side view in elevation of the robotic vehicle and drive reconfiguration system shown in FIG. 1.
Figure 3:
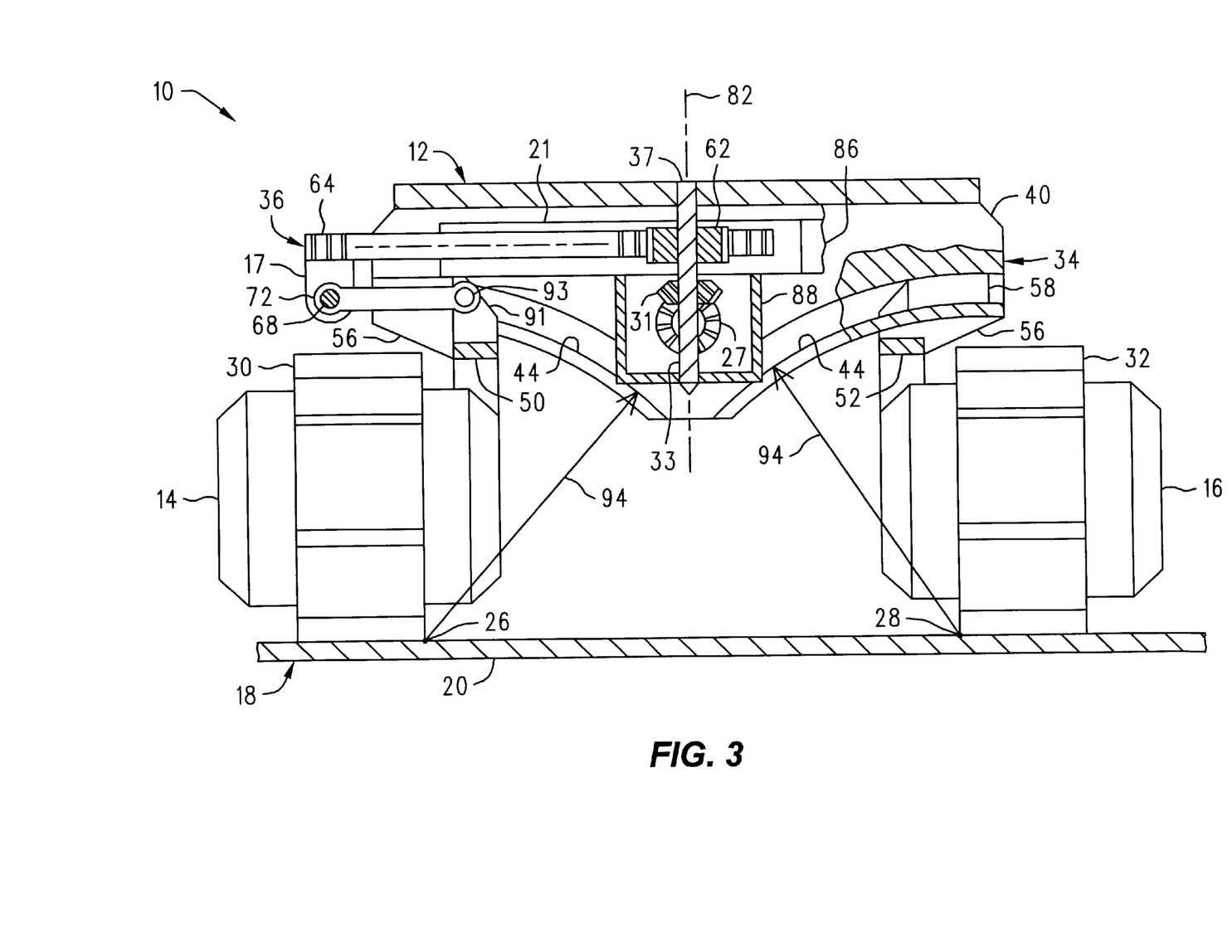
FIG. 3 is a sectional view in elevation of the robotic vehicle and drive reconfiguration system taken along the line 3—3 of FIG. 1.

A drive reconfiguration system 10 for a robotic vehicle 12 is shown in FIGS. 1–3 and may be used to reconfigure the robotic vehicle 12 so that it may more effectively traverse a wide range of duct sizes and geometries. More specifically, the drive reconfiguration system 10 changes the orientations of the drive units 14 and 16 with respect to the main body 42 of vehicle 12, therefore allowing the drive units 14 and 16 to maintain optimal contact with the surface being traversed. For example, the drive reconfiguration system 10 may be used to place the drive units 14, 16 in a first or "flat" configuration (shown in FIGS. 1–3) which allows the robotic vehicle 12 to traverse a duct system 18 having a flat floor section 20, as best seen in FIG. 3. Alternatively, the drive reconfiguration system 10 may be used to place the drive units 14, 16 in a second or "tilted" configuration to allow the robotic vehicle to more effectively traverse a duct system 22 having a curved floor section 24. See FIG. 7.

Essentially, the drive reconfiguration system 10 comprises two major subsystems: A guide system 34 and an actuator system 36. See FIG. 3. The guide system 34 allows the drive units 14 and 16 to be rotated about respective centers or axes of rotation 26 and 28 (FIG. 3). In one preferred embodiment, the drive units 14 and 16 may be positioned at any point between a first position (e.g., corresponding to the "flat" configuration shown in FIGS. 1–3) and a second position (e.g., corresponding to the "tilted" configuration shown in FIG. 7). The actuator system 36 is connected to the drive units 14 and 16 and is used to rotate the drive units 14 and 16 about their respective centers of rotation 26 and 28 between the first and second positions, e.g., those positions shown in FIGS. 3 and 7.

Figure 4:
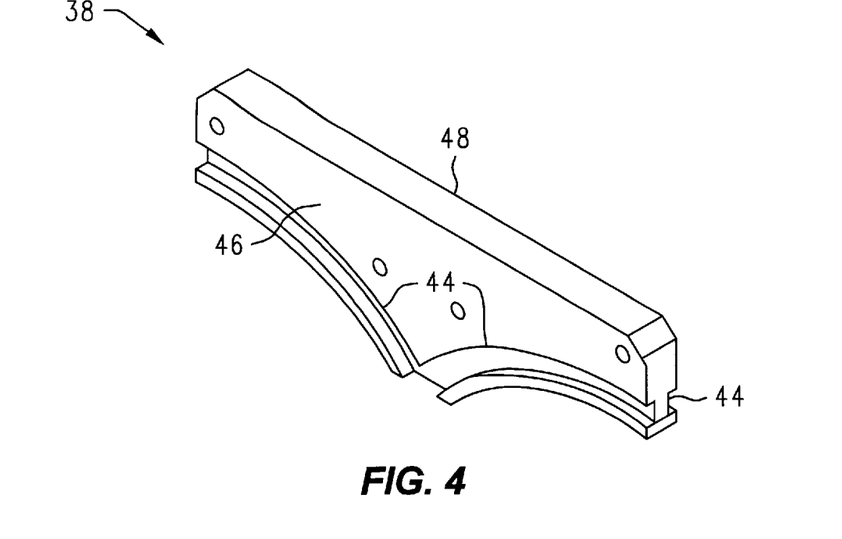
FIG. 4 is a perspective view of the front guide member.

Referring now to FIGS. 1–4 simultaneously, the guide system 34 may comprise front and rear guide members or end plates 38 and 40 that are mounted to the front and rear ends 39, 41 of the vehicle body 42. The front and rear guide members or end plates 38 and 40 are substantially identical and include a plurality of arcuate channels 44, as best seen in FIG. 4. In one preferred embodiment, each guide member 38, 40 includes four (4) arcuate channels 44; two (2) on either side 46, 48 of the guide member or plate 38, 40. For example, referring now specifically to FIG. 4, the front guide member or end plate 38 includes two arcuate channels 44 on the front side 46 and two arcuate channels 44 on the rear side 48. The arrangement of the arcuate guide channels 44 on the rear guide member 40 may be essentially identical to the arrangement on the front guide member 38.

The drive units 14 and 16 of the robotic vehicle 12 are slidably mounted to the front and rear guide members 38 and 40 by respective drive unit brackets 50 and 52. Each drive unit bracket 50, 52 includes a front bearing member 54 and a rear bearing member 56. See FIG. 5. Further, each bearing member 54, 56 may include a pair of bearing "shoes" 58 which are sized to slidably engage the arcuate channels 44 in the guide members 38 and 40. Accordingly, the drive unit brackets 50 and 52 guide the corresponding drive units 14 and 16, allowing them to be rotated about their respective centers or axes of rotation 26 and 28 (FIG. 3) with respect to the main body 42 of vehicle 12.

Figure 7:
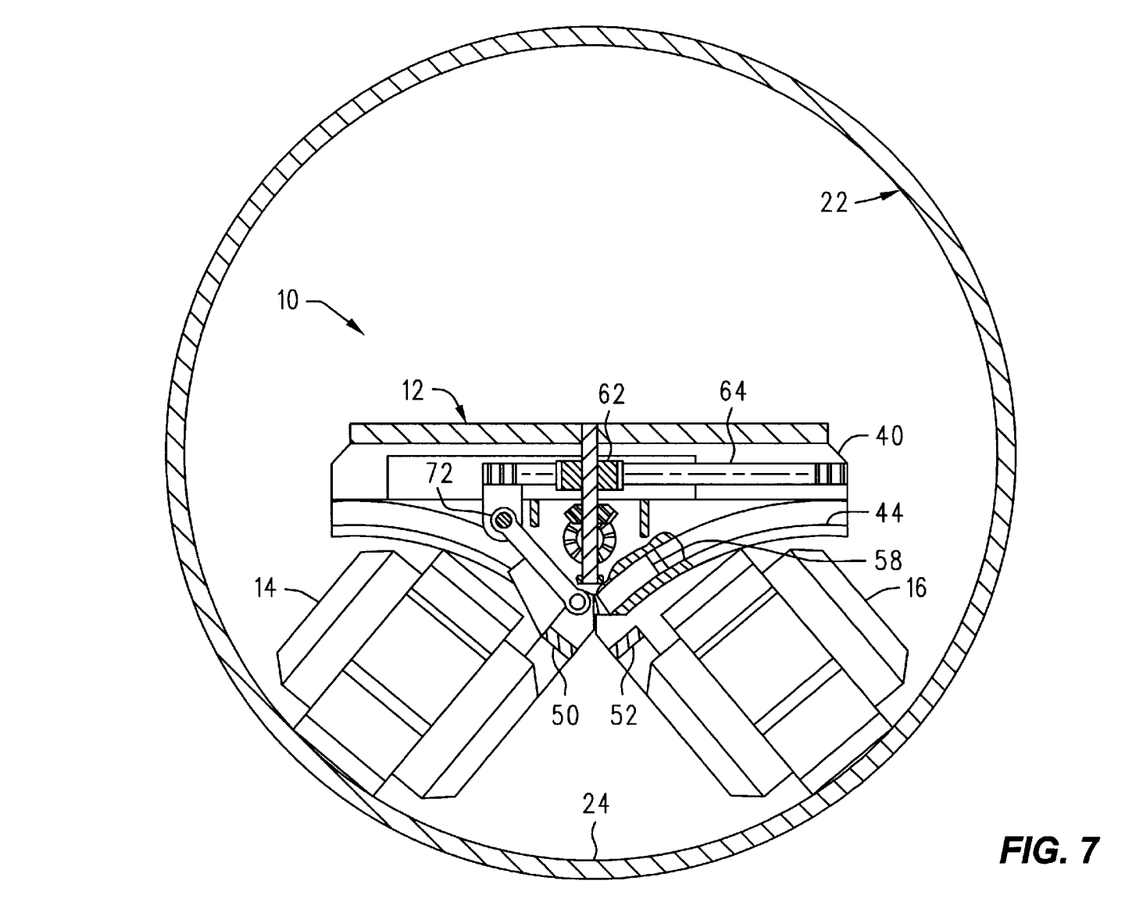
FIG. 7 is a sectional view in elevation of the robotic vehicle and drive reconfiguration system with the drive units reconfigured to allow the robotic vehicle to traverse a circular duct having a curved floor section.

The actuator system 36 is attached to the drive unit brackets 50 and 52 and rotates the drive units 14 and 16 about their respective centers of rotation 26 and 28 in a synchronized manner between the first or flat position illustrated in FIGS. 1–3 and the second or tilted position illustrated in FIG. 7. That is, the actuator system 36 rotates both drive units 14 and 16 together about their respective centers of rotation 26 and 28. In one preferred embodiment, the actuator system 36 comprises a motor 60, a pinion gear 62, and a pair of gear racks 64 and 66. The pinion gear 62 is connected to the motor 60 so that the pinion gear 62 rotates about pinion gear axis 82. The gear racks 64 and 66 are slidably mounted on either side of pinion gear 62, as best seen in FIGS. 1 and 2, and are connected to the brackets 50 and 52 by respective linkage assemblies. The gear racks 64 and 66 convert the rotary motion of the pinion gear 62 into linear motion which is then transferred to the drive units 14 and 16 by the brackets 50 and 52 and respective linkage assemblies.

Referring now to FIGS. 1–3, the first gear rack 64 is connected to the right side drive unit bracket 50 by a right side spreader rod 68 and a pair of right side links 70 and 72. Similarly, the second gear rack 66 is connected to the left side drive unit bracket 52 by a left side spreader rod 74 and a pair of left side links 76 and 78. Consequently, when the motor 60 turns the pinion gear 62, the gear racks 64 and 66 are driven back and forth in opposite directions transverse to the longitudinal axis 80 of vehicle 12. See FIG. 1. This back and forth motion of the gear racks 64 and 66 causes the drive units 14 and 16 to be rotated about their respective centers of rotation 26 and 28 between the first or flat configuration (FIG. 3), and the second or tilted configuration (FIG. 7).

In order to operate the robotic vehicle 12 to traverse a duct system, an operator (not shown) may first configure the robotic vehicle 12 as required for the type of duct system to be encountered. For example, if the duct system to be traversed comprises a duct system 18 having a rectangular cross section with a flat floor section 20, then the operator may operate a suitable motor control system (not shown) to actuate the drive reconfiguration system 10 as necessary to place the drive units 14 and 16 in the first or flat configuration illustrated in FIGS. 1–3. This first or flat configuration is ideal for traversing duct systems and other members or objects having flat floor sections since the tracks 30, 32 of each drive unit 14, 16 are essentially perpendicular to the flat floor section. That is, the first or flat configuration maximizes the contact of the tracks 30, 32 with the flat floor section 20.

If, on the other hand, the duct system to be traversed by the robotic vehicle 12 comprises a duct system 22 having a circular cross section with a curved floor section 24, then the operator may actuate the drive reconfiguration system 10 as necessary to place the drive units 14 and 16 in the second or tilted configuration illustrated in FIG. 7. In this second configuration, the drive units 14 and 16 remain essentially perpendicular to the curved floor section 24, which allows the respective tracks 30, 32 to make substantially full contact with the curved floor section 24 even though the floor section 24 is curved substantially. In any event, after the vehicle 12 has been configured for the particular duct system, it may be released into the duct system to perform the required "mission," (e.g., inspection or cleaning of the duct system, as the case may be).

A significant advantage of the drive reconfiguration system 10 according to the present invention is that it allows the drive units 14 and 16 to be easily and quickly reconfigured for a specific duct system, but without the need to resort to special brackets or adapters. The reconfiguration system 10 also allows the configuration of the drive units to be changed "on the fly" thereby allowing the vehicle 12 to readily reconfigured to accommodate variations in duct system size and/or geometry. For example, the drive reconfiguration system 10 may be used to configure the drive units 14, 16 of the robotic vehicle 12 for a first section of the duct system. Then, if the geometry of the duct system changes, e.g., if the geometry of the duct system changes from a rectangular cross-section to a circular cross-section, the operator may reconfigure the robotic vehicle 12 as soon as it encounters the new duct geometry.

Still other advantages are associated with the guide system 34. For example, the forces required to rotate the drive units 14 and 16 between the first and second positions are minimized since the guide system 34 forces the drive units 14 and 16 to rotate about respective centers of rotation 26 and 28 that are coincident with a point where the drive units contact the floor. This minimized actuation force allows a smaller motor to be used and/or allows the reconfiguration process to occur at increased speeds with a given motor size. The guide system 34 also allows the drive units 14 and 16 to be positioned at any point between the first or flat configuration and the second or tilted configuration, thereby allowing the vehicle 12 to more effectively traverse a wide range of curved floor sections. That is, the guide system 34 allows the vehicle 12 to be configured for duct systems having curvatures ranging from an infinite radius (i.e., flat floor sections) to a "minimum" radius, which is defined by the maximum degree of tilt achievable when the drive units 14 and 16 are placed in the second or tilted position illustrated in FIG. 7.

The advantages associated with the actuator system 36 include synchronized movement of both drive units 14 and 16 from a single actuator (e.g., motor 60), thus dispensing with the need to provide two motors and/or position feedback apparatus to coordinate the movement of the drive units 14 and 16 so that their movement is synchronized. The actuator system 36 is also compact which provides the robotic vehicle 12 with more room for sensing equipment and/or allows the vehicle to be made as small as possible to traverse duct systems having small sizes.

Having briefly described the drive reconfiguration system 10, along with some of its more significant features and advantages, the drive reconfiguration system 10 according to the present invention will now be described in detail. However, before proceeding with the detailed description, it should be understood while that the drive reconfiguration system 10 is shown and described herein as it could be used with one type of robotic vehicle 12, it is not limited to any particular type of vehicle. Indeed, the drive reconfiguration system 10 according to the present invention may be used with any type of vehicle wherein it is desired to reconfigure the drive units of the vehicle to allow the vehicle to more effectively traverse curved surfaces. Consequently, the drive reconfiguration system 10 should not be regarded as limited to the particular vehicle 12 and applications shown and described herein.

Figure 6:
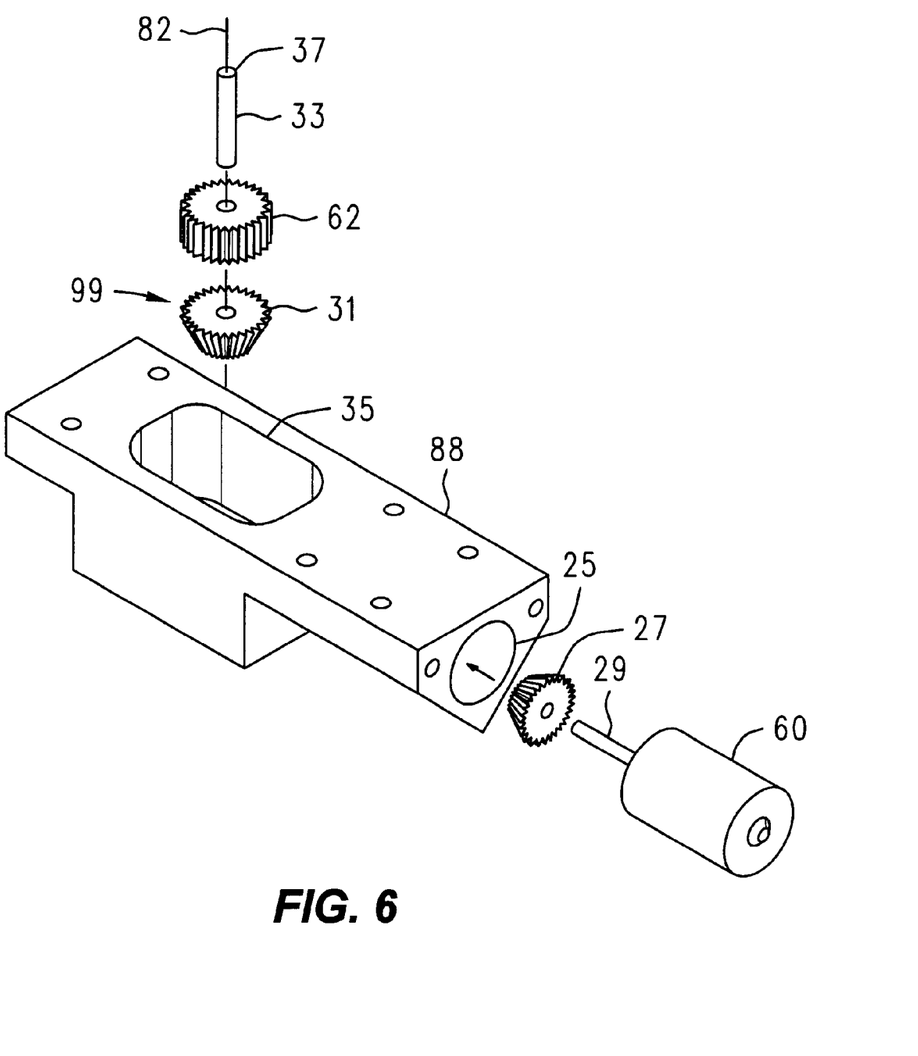
FIG. 6 is a perspective view of the spine block, motor, and gear assembly.

Referring back now to FIGS. 1–3, one embodiment of the drive reconfiguration system 10 may be used to reconfigure the drive units 14 and 16 of a robotic vehicle 12 to allow the robotic vehicle 12 to more effectively traverse duct systems having a wide range of sizes and geometries. In the embodiment shown and described herein, the robotic vehicle 12 may include a vehicle body section 42 that comprises a front frame or spar section 84 and a rear frame or spar section 86. The front and rear frame or spar sections 84 and 86 are joined together by a spine block 88 which may be mounted to the underside of the front and rear frame sections 84 and 86. See FIGS. 1, 3, and 6. The spine block 88 may be attached to the front and rear frame or spar sections 84 and 86 by any convenient fastening system or device, such as by screws 92, although other fastening devices or systems could also be used. Spine block 88 also houses the motor 60, bevel gear assembly 99, and pinion gear 62, as will be described in greater detail below. The vehicle body 42 may also include a top cover 90 to provide additional strength and rigidity to the body 42. Top cover 90 also provides a convenient mounting platform for other systems and devices, e.g., batteries, electronic control systems, video cameras, sensing devices, etc., (not shown) that may be required or desired for the particular application.

The front and rear frame or spar sections 84 and 86, as well as the top cover 90, may be made from any of a wide variety of materials, such as metals or plastics, suitable for the intended application. In one preferred embodiment, the front and rear frame or spar section 84 and 86 are made from 6061-T6 aluminum, although other materials could also be used. The spine block 88 may also be made from any of a wide range of materials, such as metals or plastics, again depending on the intended application. In one preferred embodiment, the spine block 88 is also made from 6061-T6 aluminum, although other materials may also be used.

The robotic vehicle 12 may be propelled by a pair of drive units 14 and 16. In one preferred embodiment, the drive units 14 and 16 comprise crawler track drive assemblies having respective drive tracks 30 and 32. The drive tracks 30 and 32 of respective drive units 14 and 16 may be made from any of a wide variety of flexible, resilient materials, such as vulcanized rubber, which provides a high friction coefficient against most surfaces. The crawler track drive assemblies therefore provide the vehicle 12 with excellent traction and stability. Alternatively, the vehicle 12 may be provided with other types of drive units, such as wheeled drive units, that are known in the art and which may be used with certain types of vehicles or in certain applications. However, since the drive reconfiguration system 10 according to the present invention could also be used to change the configuration of wheeled drive units in the same way that it changes the configuration of crawler track drive units, the present invention should not be regarded as limited to use with robotic vehicles having crawler track drive units 14 and 16 of the type shown and described herein. Also, since crawler track drive units, such as the type shown and described herein, are well-known in the art and could be easily provided by persons having ordinary skill in the art after becoming familiar with the teachings of the present invention, the particular crawler track drive units 14 and 16 utilized in one preferred embodiment will not be described in further detail.

Proceeding now with the description, the drive reconfiguration system 10 according to the present invention comprises two major subsystems: A guide system 34 and an actuator system 36. See FIG. 3. These two systems will now be described.

The guide system 34 allows each drive unit 14, 16 to be rotated about a corresponding center or axis of rotation 26, 28. In one preferred embodiment, the guide system 34 comprises a front guide member or end plate 38 and a rear guide member or end plate 40. The front guide member 38 may be attached to the front end 39 of front frame or spar assembly 84 by any convenient fastening device or system (e.g., by screws). Similarly, the rear guide member 40 may be attached to the rear end 41 of rear frame or spar member 86 by screws or other fasteners.

Each guide member 38, 40 is essentially identical and includes a plurality of arcuate guide channels 44, each of which comprises a circular segment having a radius of curvature 94 that is centered on the center (i.e., axis) of rotation 26, 28 for each respective drive unit 14, 16. See FIG. 3. Each guide member 38, 40 is provided with four (4) such arcuate guide channels 44. For example, referring now to FIG. 4, the front guide member 38 is provided with two arcuate guide channels 44 on the front surface 46 of guide member 38 and two guide channels 44 on the rear surface 48 of guide member 38. In one preferred embodiment, the arcuate guide channels 44 that are located on the rear surface 48 of guide member 38 are aligned (i.e., located directly behind) the guide channels 44 on the front surface 46 of guide member 38, as best seen in FIGS. 2–4. The rear guide member 40 is essentially identical to the front guide member 38 and will not be described in further detail herein.

The front and rear guide members or end plates 38 and 40 may be made from any of a wide range of materials, such as metals or plastics, suitable for the intended application. In one preferred embodiment, each guide member 38, 40 is fabricated from 6061-T6 aluminum, although other materials could also be used.

The drive unit assemblies 14 and 16 are guided along the arcuate guide channels 44 in the guide members 38, 40 by respective bracket assemblies 50, 52. The bracket assemblies 50 and 52 are essentially identical, except that the two bracket assemblies 50, 52 are mirror images of each other. That is, right side bracket 50 is configured to mount to the right side drive unit 14 and guides, whereas the left side bracket 52 is designed to mount to the left side drive unit 16. Referring now to FIGS. 1–3 simultaneously, with occasional reference to FIG. 5, each bracket assembly 50, 52 includes a front bearing member 54 and a rear bearing member 56. The front bearing member 54 of each bracket assembly 50, 52 engages the arcuate guide channels 44 in the front guide member or end plate 38, whereas the rear bearing members 56 engage the arcuate guide channels 44 in the rear guide member or end plate 40. See FIGS. 1 and 2.

Figure 5:
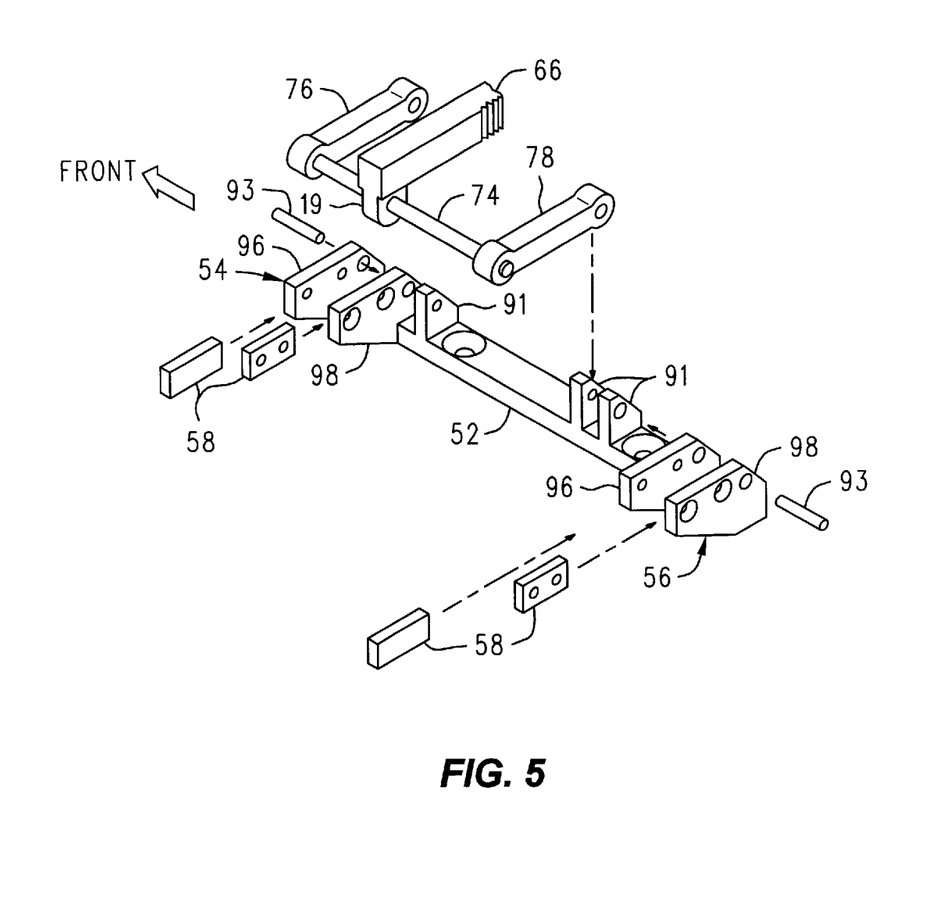
FIG. 5 is an exploded view in perspective of the left side drive unit bracket assembly, connecting links, spreader rod, and guide shoes.

In one preferred embodiment, the front and rear bearing members 54 and 56 of each bracket assembly 50, 52 are provided with a pair of bearing shoes 58, as best seen in FIG. 5. Each bearing shoe 58 comprises an arcuate member having a radius of curvature that is substantially equal to the radius of curvature 94 of the various arcuate guide channels 44. Each bearing shoe 58 is also sized to be slidably received by the arcuate guide channels 44. The bearing shoes 58 may be attached to the front and rear flanges 96 and 98 of the bearing members 54 and 56 by any convenient device or system, such as by screws (not shown) or by a suitable adhesive. The bearing shoes 58 should be made from a material that will provide a low-friction interface with the arcuate guide channels 44. In one preferred embodiment, each bearing shoe 58 is made from Teflon®, although other low friction materials may also be used.

Each bracket assembly 50, 52 may also include a plurality of link flanges 91 that are sized and spaced to receive the corresponding links 70, 72, 76, and 78. Each of the various links 70, 72, 76, and 78 may be pivotally mounted to the link flanges 91 by a pivot pin 93, as best seen in FIG. 5. Note that the forward-most links 70 and 76 are mounted between a link flange 91 and the rear flange 98 of the forward bearing assembly 54. The bracket assemblies 50 and 52 may be secured to the corresponding drive units 14 and 16 by any convenient fastener or system. For example, in one preferred embodiment, each bracket 50, 52 is secured to the drive units 14 and 16 by a pair of screws 15, as best seen in FIG. 1.

The brackets 50, 52 may be made from any of a wide range of materials (e.g., metals or plastics) suitable for the intended application. Consequently, the present invention should not be regarded as limited to brackets being fabricated from any particular type of material. By way of example, in one preferred embodiment, each bracket assembly 50, 52 is fabricated from 6061-T6 aluminum.

The bracket assemblies 50 and 52 are connected to the actuator system 36 by links and spreader rods. More specifically, right side bracket 50 is connected to gear rack 64 by a front link 70, a rear link 72, and a right side spreader rod 68. One end of each of each link 70, 72 is pivotally connected to the link flanges 91 of bracket 50 by a pivot pin 93, whereas the other end of each link 70, 72 is pivotally mounted to the spreader rod 68. See FIGS. 1–3 and FIG. 5. The spreader rod 68 is pivotally mounted to the gear rack 64 via a rod hanger 17 which may be secured to the gear rack 64 by any convenient fastener device, such as by screws (not shown).

The arrangement for the left side drive unit 16 is essentially identical to the arrangement just described for the right side drive unit 14. That is, the left side bracket 52 is connected to the gear rack 66 by a front link 76, a rear link 78, and a left side spreader rod 74. One end of each of the links 76, 78 is pivotally mounted to the link flanges 91 of left side bracket 52 by a pivot pin 93, whereas the other end of each link 76, 78 is pivotally mounted to the spreader rod 74. See also FIG. 5. Spreader rod 74 is in turn pivotally mounted to the gear rack 66 via a rod hanger 19, which may be secured to gear rack 66 by any convenient fastening device, such as by screws (not shown).

The various components of the linkage assemblies for connecting the right and left side brackets 50, 52 to the respective gear racks 64, 66 may be made from any of a wide range of materials, including metals and plastics, suitable for the intended application. In one preferred embodiment, each link 70, 72, 76, and 78 is fabricated from 6061-T6 aluminum. The pivot pins 93 may be fabricated from 303 stainless steel (e.g., Berg ground shaft model S3-20, available from W. M. Berg, Inc., of East Rockaway, N.Y.). The spreader rods 68 and 74 also may be fabricated from 303 stainless steel (e.g., Berg ground shaft model S2-60, available from W. M. Berg, Inc.). The rod hangers 17 and 19 may be made from stainless steel. Alternatively, the rod hangers 17 and 19 could comprise an integral part of the gear racks 64 and 66, in which case they could comprise the same material as the gear racks 64 and 66.

Gear racks 64, 66 may be slidably mounted to the body 42 of robotic vehicle 12 by respective rack support members 21, 23, as best seen in FIGS. 1 and 2. More specifically, rack support member 21 is mounted to the rear frame 86, whereas rack support member 23 is mounted to the front frame 84. The rack support members 21 and 23 may be mounted to the respective rear and front frame members 86 and 84 by any convenient fastening device or system. In one preferred embodiment, the rack support members 21 and 23 are mounted to the rear and front frames 86 and 84 by screws (not shown).

The gear racks 64, 66 and rack support members 21 and 23 may be fabricated from any of a wide variety of materials suitable for the intended application. In one preferred embodiment, each gear rack 64, 66 is fabricated from 416 stainless steel (e.g., Berg gear rack model R2-15, available from W. M. Berg, Inc.). Each rack support member 21, 23 may comprise a crossed roller slide No. Rx1-3, available from Tusk Direct, Inc., of Bethel, Conn.

Each gear rack 64, 66 is driven by a pinion gear 62 that is rotated by motor 60. In one preferred embodiment, the motor 60 is mounted horizontally and is coupled to the pinion gear 62 by a bevel gear assembly 99. More specifically and referring primarily to FIGS. 3 and 6, the motor 60 is mounted within a suitable aperture 25 in the spine block 88. A first bevel gear 27 is mounted to the output shaft 29 of motor 60 so that the two rotate together. A second bevel gear 31 is mounted on a shaft 33. Shaft 33 is journalled for rotation within the gear well 35 so that the second bevel gear 31 engages the first bevel gear 27. The pinion gear 62 is also mounted to the shaft 33 so that the pinion gear 62 rotates with the second bevel gear 31. The upper end 37 of shaft 33 may be journalled for rotation in the top cover 90, as best seen in FIG. 3.

The motor 60 may comprise any of a wide range of motors suitable for the intended application. By way of example, in one preferred embodiment, the motor 60 may comprise a permanent magnet d.c. motor, such as model no. 1319T024S123+14/1–246:1+HEM1319T10+X0437, available from Micromo Electronics, Inc., of St. Petersburg, Fla. This motor comprises a 24 volt d.c. motor with a 246:1 gear reduction ratio and magnetic encoder. Alternatively, other types of motors could also be used. The various gears, e.g., bevel gears 27 and 31 and pinion gear 62 may be made from any material, such as metals or plastics, suitable for the intended application and expect loads. In one preferred embodiment, the various gears 21, 31, and 62 are fabricated from stainless steel.

The motor 60 may be actuated by a suitable electronic motor control system (not shown) of the type well-known in the art for controlling the operation of d.c. motors. The motor control system (not shown) may be mounted on the main body 42 of vehicle 12 and may be controlled by the operator from a remote location, along with other systems and devices that may be provided on the robotic vehicle 12. However, since such electronic motor control systems are well-known in the art, as are remote operating systems for controlling such motor control systems and other systems associated with robotic vehicles, the motor control system utilized in one preferred embodiment of the present invention will not be further described herein.

The drive reconfiguration system 10 may be operated as follows to change the configuration of the drive units 14 and 16 with respect to the body 42 of vehicle 12. For example, if it is desired to configure the vehicle 12 to traverse a duct system 18 having a flat floor section 20, such as the type shown in FIG. 3, then the operator (not shown) would operate the motor control system (not shown) to actuate the motor 60 to place the drive units 14 and 16 in the first position shown in FIGS. 1–3. In the embodiment shown and described herein, the motor control system (not shown) would operate the motor 60 so that the pinion gear 62 rotates in the counter-clockwise direction. As the pinion gear 62 rotates in the counter-clockwise direction, both gear racks 64 and 66 move outward, ultimately reaching the fully extended position shown in FIGS. 1 and 3. In one preferred embodiment, the magnetic encoder (not shown) provided on the motor assembly is used to provide information relating to the direction of rotation and the number of rotations made by the motor 60. This information then may be used to determine the positions of the gear racks 64, 66. Alternatively, a suitable position sensor (not shown) attached to the gear racks 64, 66 could be used to provide an indication of the positions of the gear racks 64, 66. Once the gear racks 64 and 66 are fully extended, the control system (not shown) would de-activate the motor 60. The drive units 14 and 16 of the vehicle 12 are then placed in the first or flat configuration illustrated in FIGS. 1–3.

If it is desired to reconfigure the drive units 14, 16 so that the vehicle 12 may more effectively traverse duct systems having curved floors, the motor control system (not shown) would be actuated to cause the motor 60 to rotate the pinion gear 62 in the clockwise direction. As the pinion gear 62 rotates in the clockwise direction, it begins retracting simultaneously both gear racks 64 and 66. The retracting gear racks 64, 66 cause the right and left side brackets 50 and 52 to begin traveling along the arcuate channels 44 in the front and rear guide members 38 and 40 which tilts the drive units 14 and 16, allowing them to more effectively traverse curved floor sections. The motor 60 may be stopped when the bearing members 54 and 56 of the brackets 50 and 52 are at any desired position along the arcuate guide channels 44, thereby allowing the drive units to be properly configured for any of a wide range of curvatures of the floor section. Alternatively, the motor 60 may be operated until the gear racks 64 and 66 have been moved to the fully retracted position illustrated in FIG. 7. This fully retracted position corresponds to the maximum tilt of the drive units 14, 16.

It is contemplated that the inventive concepts herein described may be variously otherwise embodied and it is intended that the appended claims be construed to include alternative embodiments of the invention except insofar as limited by the prior art.

I claim:

1. Drive reconfiguration apparatus for changing configuration of first and second drive units with respect to a vehicle body to enable the vehicle body to traverse flat and curved surfaces, comprising:

a guide system operatively associated with the vehicle body and the drive units, said guide system allowing said first and second drive units to rotate about respective first and second centers of rotation, each center being located at about a point where the drive unit contacts the surface being traversed that is closest to the longitudinal axis of the vehicle body; and an actuator system mounted to the vehicle body and operatively associated with said drive units for rotating the drive units about the first and second centers of rotation between a first position and a second position.

2. The drive reconfiguration apparatus of claim 1, wherein said guide system comprises:

a guide member mounted to the vehicle body; and a bearing member mounted to the drive unit, said bearing member engaging the guide member so that said guide member and said bearing member cooperate to guide the drive unit between the first position and the second position as the drive unit rotates about the center of rotation.

3. The drive reconfiguration apparatus of claim 2, wherein said guide member comprises an arcuate channel and wherein said bearing member comprises a bearing sized to be received by said arcuate channel.

4. The drive reconfiguration apparatus of claim 2, wherein the vehicle body extends along a longitudinal axis and wherein the center of rotator is located on a reconfiguration axis that is generally parallel to the longitudinal axis.

5. The drive reconfiguration apparatus of claim 4, wherein said drive unit comprises a first drive assembly positioned on a first side of the vehicle body and a second drive assembly positioned on a second side of the vehicle body and wherein said guide system comprises a first bearing member mounted to said first drive assembly and a second bearing member mounted to said second drive assembly, said first and second bearing members engaging said guide member so that said first drive assembly may be rotated about a first center of rotation for said first drive assembly and so that said second drive assembly may be rotated about a second center of rotation for said second drive assembly.

6. The drive reconfiguration apparatus of claim 5, wherein said actuator system is connected to said first drive assembly and said second drive assembly so that said first and second drive assemblies are rotated together about the first and second centers of rotation, respectively.

7. The drive reconfiguration apparatus of claim 6, wherein said first and second drive assemblies comprise crawler track drive assemblies.

8. The drive reconfiguration apparatus of claim 6, wherein said actuator system comprises:
a motor mounted to the vehicle body;
a pinion gear operatively associated with said motor;
a first gear rack slidably mounted to the vehicle body and operatively associated with said pinion gear, said first gear rack also being connected to said first drive assembly; and
a second gear rack slidably mounted to the vehicle body and operatively associated with said pinion gear, said second gear rack also being connected to said second drive assembly.

9. The drive reconfiguration apparatus of claim 8, wherein said pinion gear is connected to said motor by a bevel gear assembly.

10. The drive reconfiguration apparatus of claim 8, wherein a first link connects said first gear rack to said first drive assembly and wherein a second link connects said second gear rack to said second drive assembly.

11. A vehicle for traversing flat and curved surfaces, comprising
a vehicle body having a first side and a second side:
a first drive assembly mounted to the first side of said vehicle body so that said first drive assembly may be rotated about a first center of rotation located at about a point where said first drive assembly contacts the surface being traversed that is closest to the longitudinal axis of the vehicle body;
a second drive assembly mounted to the second side of said vehicle body so that said second drive assembly may be rotated about a second center of rotation located at about a point where the second drive assembly contacts the surface being traversed that is closest to the longitudinal axis of the vehicle body; and
an actuator mounted to said vehicle body and operatively associated with said first and second drive assemblies, said actuator simultaneously rotating said first and second drive assemblies about the first and second centers of rotation respectively.

12. The vehicle of claim 11, wherein said actuator comprises:
a motor mounted to said vehicle body;
a pinion gear operatively associated with said motor;
a first gear rack slidably mounted to said vehicle body and operatively associated with said pinion gear, said first gear rack also being connected to said first drive assembly; and
a second gear track slidably mounted to said vehicle body and operatively associated with said pinion gear, said second gear rack also being connected to said second drive assembly.

13. The vehicle of claim 12, wherein said pinion gear is connected to said motor by a bevel gear assembly.

14. The vehicle of claim 12, wherein a first link is used to connect said first gear rack to said first drive assembly and wherein a second link is used to connect said second gear rack to said second drive assembly.

15. The vehicle of claim 11, wherein said first and second drive assemblies comprise crawler track drive assemblies.

16. The vehicle of claim 11, further comprising:
a front guide member mounted to a front end of said vehicle body; and
a rear guide member mounted to a rear end of said vehicle body, said first and second drive assemblies being moveably mounted to said front and rear guide members.

17. The vehicle of claim 16, further comprising:
a first bracket assembly mounted to said first drive unit, said first bracket assembly including a front bearing member and a rear bearing member, the front and rear bearing members of said first bracket assembly engaging said front and rear guide members; and
a second bracket assembly mounted to said second drive unit, said second bracket assembly including a front bearing member and a rear bearing member, the front and rear bearing members of said second bracket assembly engaging said front and rear guide members.

18. The vehicle of claim 17, wherein said front and rear guide members each include a first arcuate channel and a second arcuate channel and wherein the first and second arcuate channels of said front and rear guide members are adapted to receive the front and rear bearing members of said first and second bracket assemblies.

19. The vehicle of claim 18, wherein said actuator comprises:
a motor mounted to said vehicle body;
a pinion gear operatively associated with said motor;
a first gear rack slidably mounted to said vehicle body and operatively associated with said pinion gear, said first gear rack also being connected to said first bracket assembly; and
a second gear rack slidably mounted to said vehicle body and operatively associated with said pinion gear, said second gear rack also being connected to said second bracket assembly.

20. The vehicle of claim 19, further comprising:
a first spreader rod having a front end and a rear end, said first spreader rod being mounted to said first gear rack so that said first spreader rod extends in a direction that is generally transverse to said first gear rack;
a front link having a first end and a second end, the first end of said front link being pivotally mounted to said first spreader rod at about the front end of said first spreader rod, the second end of said front link being pivotally mounted to said first bracket assembly; and
a rear link having a first end and a second end, the first end of said rear link being pivotally mounted to said first spreader rod at about the rear end of said first spreader rod, the second end of said rear link being pivotally mounted to said first bracket assembly.

21. The vehicle of claim 20, further comprising:
a second spreader rod having a front end and a rear end, said second spreader rod being mounted to said second gear rack so that said second spreader rod extends in a direction that is generally transverse to said second gear rack;
a front link having a first end and a second end, the first end of said front link being pivotally mounted to said second spreader rod at about the front end of said second spreader rod, the second end of said front link being pivotally mounted to said second bracket assembly; and
a rear link having a first end and a second end, the first end of said rear link being pivotally mounted to said second spreader rod at about the rear end of said second spreader rod, the second end of said rear link being pivotally mounted to said second bracket assembly.

* * * * *